United States Patent Office 3,334,054
Patented Aug. 1, 1967

3,334,054
PURIFICATION OF BENZOTRIAZOLE
Donald Kearey Howard, Levenshulme, Manchester, and Alan Francis Popplewell, Didsbury, Manchester, England, assignors to The Geigy Company Limited, Manchester, England
No Drawing. Filed July 27, 1964, Ser. No. 385,464
Claims priority, application Great Britain, July 27, 1963, 29,878/63
9 Claims. (Cl. 252—390)

This invention relates to the purification and decolourization of benzotriazole, to producing concentrated solutions of purified benzotriazole, and to aqueous anticorrosive preparations made therefrom by dilution.

It is known that benzotriazole as ordinarily prepared by the diazotisation of o-phenylene diamine contains a small amount, usually from 1% to 2%, of a dark coloured tarry impurity. This impurity is freely soluble in organic solvents and the solutions of benzotriazole thus obtained are unduly dark in colour. Moreover, the tarry impurity is insoluble in water, and aqueous solutions of benzotriazole which contain it are consequently found to be cloudy and contaminated with surface scum. Benzotriazole finds wide application as an antioxidant and as a substance which exhibits marked efficacy in eliminating or reducing corrosion, notably of copper and cupriferous alloys, when it is applied thereto. Instances occur where the tarry impurity can lead to undesirable staining of the vehicle into which crude benzotriazole is incorporated as an antioxidant and, if aqueous solutions containing benzotriazole are applied to the surface of the copper and copper-base alloys with the object of inhibiting corrosion, it is most undesirable that any residue or scum be deposited upon the metal.

According to the present invention, there is provided a process of producing a concentrated solution of purified benzotriazole which comprises dissolving the benzotriazole in a water-miscible glycol or polyglycol solvent, and treating the resultant solution at an elevated temperature with a decolourizing material. The present invention also provides concentrated solutions of benzotriazole so produced.

We have found that benzotriazole is surprisingly soluble in water-miscible glycol or polyglycol solvents and that it is possible to obtain concentrations of 10% to 40% by weight.

The present invention also includes concentrated solutions of benzotriazole produced by the aforesaid process; and aqueous solutions, prepared therefrom by dilution with water, containing the purified benzotriazole.

The solvents which can be used in the process of this invention are, preferably, ethylene glycol or another commercially available glycol or polyglycol, for example propylene glycol, hexylene glycol, polyethylene glycol and polypropylene glycol, or a mixture of two or more thereof.

A preferred decolourizing material is activated charcoal. However, other conventional decolourizing materials may also be used, for example activated clay, activated alumina, activated bone black, kieselguhr, fuller's earth or pumice.

The duration of the decolourizing treatment is not critical but, in general, a minimum period of 60 minutes is advantageous. Preferably, the decolourizing treatment is conducted within a temperature range of from 80° to 100 C., although a higher temperature up to the boiling point of the glycol or polyglycol solvent may be used if desired.

It is preferred, in order to recover benzotriazole adsorbed on the decolourizing material, to wash the decolourizing material with which the benzotriazole solution has been treated with a further quantity of the glycol or polyglycol solvent, preferably maintained at an elevated temperature.

After treatment with the decolourizing material, the benzotriazole solution may be separated from the decolourizing material, conveniently by filtration.

The proportion of the benzotriazole in the concentrated solution thus produced may vary within a wide range, depending on the concentration of benzotriazole in the original solution before treatment with the decolourizing material and the temperature at which the treatment is carried out, but conveniently the concentrated benzotriazole solution produced contains a proportion of benzotriazole in the range of from 10% to 40% by weight.

A stabilized and decolourized solution of benzotriazole may thus be obtained which is eminently suitable for dilution with water to provide a liquid which, for example, may be applied in any of a variety of ways to a copper or copper alloy surface to inhibit corrosion thereof. The diluted solution may be, for instance, incorporated into paper or other packaging material in which the copper or copper alloy may be wrapped, or the solution may be sprayed on to the surface to be protected, or the surface of the copper or copper alloy may be immersed in the diluted benzotriazole solution.

The invention is further illustrated by the following example.

Example

Benzotriazole, prepared by the diazotisation of o-phenylenediamine with sufficient nitrous acid to react with only one of the amino groups and containing approximately 2% of a tarry impurity, was dissolved in ethylene glycol to form a 40% weight/weight solution. The liquid was then heated to 80° C. and stirred for 1 hour at 80° to 100° C. with one-fifth of its weight of activated charcoal, after which time the solid material was filtered off. The filtrate was found to correspond to a 36% weight/weight solution of benzotriazole in ethylene glycol. The colour of the treated solution was very much lighter than that of the original solution.

The filter-cake of activated charcoal was then washed with a further quantity of ethylene glycol at 80° to 90° C. The filtrate contained 28% by weight of benzotriazole and this was combined with the first filtrate to give a purified concentrated solution of benzotriazole in ethylene glycol.

On diluting this concentrated solution with water to furnish a benzotriazole content of from 0.01% to 5.0% by weight based on the total weight of diluted solution, the resultant liquid was found to be well suited to the treatment of copper surfaces with the object of inhibiting corrosion.

When one uses propylene glycol, hexylene glycol or polyethylene glycol or polypropylene glycol or mixtures of two or more, similar results are obtained.

We claim:
1. A water-miscible concentrated solution of benzotriazole in a water-miscible solvent selected from the group consisting of ethylene glycol, propylene glycol, hexylene glycol, polyethylene glycol, polypropylene glycol, and mixtures thereof, benzotriazole being present in said solution in an amount of from 10% to 40% by weight.
2. The water-miscible concentrated solution as defined in claim 1 wherein no color forming impurities are present in said solution.
3. The water-miscible concentrated solution as defined in claim 1 wherein said water-miscible solvent is ethylene glycol.
4. A process for producing a water-miscible concentrated solution of benzotriazole, free of color forming impurities, comprising dissolving benzotriazole in a water-miscible solvent selected from the group consisting of ethylene glycol, propylene glycol, hexylene glycol, polyethylene glycol, polypropylene glycol and mixtures thereof, to form a solution containing benzotriazole in an amount of from 10% to 40% by weight and treating the resulting solution at an elevated temperature up to the boiling point of the solvent with a decolorizing material selected from the group consisting of activated charcoal, activated clay, activated alumina, activated bone black, kieselguhr, fuller's earth and pumice.

5. The process defined in claim 4 wherein the benzotriazole solution is treated with the decolorizing material at a temperature in the range of from 80 to 100° C.

6. The process defined in claim 4 wherein the benzotriazole solution is treated with the decolorizing material at an elevated temperature up to the boiling point of the solvent for a period of at least 60 minutes.

7. The process defined in claim 4 wherein the decolorizing material with which the benzotriazole solution has been treated is washed with a further quantity of the solvent.

8. The process defined in claim 7 wherein the further quantity of the solvent is maintained at an elevated temperature up to the boiling point of the solvent.

9. The process as defined in claim 4 wherein the water-miscible solvent is ethylene glycol.

References Cited
UNITED STATES PATENTS

| | | | |
|---|---|---|---|
| 2,803,603 | 9/1957 | Meighen | 252—75 |
| 2,861,078 | 11/1958 | Miller et al. | 260—308 |

LEON D. ROSDOL, *Primary Examiner.*

M. WEINBLATT, *Assistant Examiner.*

UNITED STATES PATENT OFFICE
CERTIFICATE OF CORRECTION

Patent No. 3,334,054            August 1, 1967

Donald Kearey Howard et al.

It is hereby certified that error appears in the above numbered patent requiring correction and that the said Letters Patent should read as corrected below.

In the heading to the printed specification, lines 5 and 6, for "assignors to The Geigy Company Limited, Manchester, England" read -- assignors, by mesne assignments, to Geigy (U.K.) Limited, Manchester, England --.

Signed and sealed this 29th day of October 1968.

(SEAL)
Attest:

Edward M. Fletcher, Jr.

Attesting Officer

EDWARD J. BRENNER

Commissioner of Patents